(12) United States Patent
Tetaz et al.

(10) Patent No.: US 12,522,031 B2
(45) Date of Patent: Jan. 13, 2026

(54) DEVICE

(71) Applicant: COMPAGNIE GENERALE DES ETABLISSEMENTS MICHELIN, Clermont-Ferrand (FR)

(72) Inventors: Pierre-Alexis Tetaz, Tokyo (JP); Mathieu Grandemange, Tokyo (JP); Remi Bouard, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 75 days.

(21) Appl. No.: 18/271,354

(22) PCT Filed: Jan. 7, 2022

(86) PCT No.: PCT/EP2022/050241
§ 371 (c)(1),
(2) Date: Jul. 7, 2023

(87) PCT Pub. No.: WO2022/148830
PCT Pub. Date: Jul. 14, 2022

(65) Prior Publication Data
US 2024/0051357 A1 Feb. 15, 2024

(30) Foreign Application Priority Data
Jan. 8, 2021 (WO) .................. PCT/JP2021/000452

(51) Int. Cl.
*B60C 19/00* (2006.01)
*B60B 19/10* (2006.01)
*B60C 23/18* (2006.01)

(52) U.S. Cl.
CPC .............. *B60C 23/18* (2013.01); *B60B 19/10* (2013.01); *B60B 2900/212* (2013.01); *B60B 2900/513* (2013.01)

(58) Field of Classification Search
CPC .... B60C 17/10; B60C 2019/007; B60C 19/00
See application file for complete search history.

(56) References Cited

U.S. PATENT DOCUMENTS 3,077,743 A  2/1963  Castro et al.
3,599,694 A *  8/1971  Bezbatchenko, Jr. .... B60C 5/14
                                                  152/43

(Continued)

FOREIGN PATENT DOCUMENTS

EP   3081444 A1   10/2016
EP   3789217 A1    3/2021

(Continued)

OTHER PUBLICATIONS

International Search Report dated Apr. 14, 2022, in corresponding PCT/EP2022/050241 (3 pages).

*Primary Examiner* — Justin R Fischer
(74) *Attorney, Agent, or Firm* — VENABLE LLP (57) ABSTRACT

A device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, comprising a cold spot placed in the inner cavity of the rolling assembly for condensing vapor contained in a gas filled in the inner cavity and a storage mean for capturing and keeping condensed vapor.

28 Claims, 4 Drawing Sheets

(56) References Cited

U.S. PATENT DOCUMENTS

| | | | |
|---|---|---|---|
| 3,675,699 A * | 7/1972 | Ocone | B60C 23/18 |
| | | | 152/450 |
| 3,708,006 A | 1/1973 | King | |
| 3,921,688 A | 11/1975 | Tsuruta | |
| 4,343,338 A | 8/1982 | Hart | |
| 7,137,417 B2 | 11/2006 | Kroll et al. | |
| 7,174,925 B2 | 2/2007 | Fritz, II | |
| 8,108,099 B2 | 1/2012 | Sawada et al. | |
| 2008/0066533 A1 | 3/2008 | Beverly et al. | |
| 2009/0015057 A1* | 1/2009 | Groomes | G09F 21/045 |
| | | | 301/37.108 |
| 2010/0235044 A1 | 9/2010 | Sawada et al. | |
| 2018/0065426 A1* | 3/2018 | Yurjevich | B60C 19/002 |
| 2019/0143765 A1 | 5/2019 | Richardson | |
| 2021/0001674 A1 | 1/2021 | Stuckey et al. | |
| 2024/0067140 A1 | 2/2024 | Tetaz et al. | |

FOREIGN PATENT DOCUMENTS

| | | | | |
|---|---|---|---|---|
| FR | 366926 | | 10/1906 | |
| JP | 2006-23084 | A | 1/2006 | |
| KR | 10-2005-0070594 | A | 7/2005 | |
| KR | 10-1957198 | B1 | 3/2019 | |
| WO | WO-9607465 | A1 * | 3/1996 | ......... B01D 46/0012 |
| WO | 2005/035277 | A1 | 4/2005 | |
| WO | 2005/084967 | A1 | 9/2005 | |
| WO | 2007/105427 | A1 | 9/2007 | |
| WO | 2009/004585 | A1 | 1/2009 | |

\* cited by examiner

DEVICE

TECHNICAL FIELD

The present invention relates to a device to be used during usage of a rolling assembly and in particular a device for preventing excessive increase of an internal pressure of the rolling assembly.

BACKGROUND ART

An internal pressure is a key element for performance of a pneumatic tire, in terms of endurance, grip, handling, etc., in particular for competition use, and it is important to predict the internal pressure during "hot" usage situation for competitiveness of the pneumatic tire. Physically, the internal pressure of a gas filled in an internal cavity of the pneumatic tire increases with temperature for a given volume according to the combined gas law (PV/T=constant, where P is the pressure, V is the volume and T is the temperature), which is expected to be linear.

In real usage situation, other mechanisms intervene the internal pressure not to increase linearly with the temperature, and presence of humidity contained in the gas filled in the internal cavity is one of such the mechanism causing overpressure which leads degradation of tire performance during usage. A tire crew is preparing, often the case, a rolling assembly using a dried gas, but as it is difficult to eliminate completely the humidity in the internal cavity and since the amount of the humidity contained in the gas filled in the internal cavity is small compared to those during "hot" usage, effectiveness and efficiency for decreasing the humidity is not satisfactory.

In order to control the internal pressure during usage, it is known that introducing a device enables to adjust the internal pressure is effective. Various solutions have been proposed to control the internal pressure during usage.

WO2005/084967 discloses a wheel having a controlled and compensated pressure comprising a rim associated with a tank adapted to be filled with a fluid to a first pressure, a tire mounted on said rim and having an inner volume inflated to an operating pressure, the operating pressure being lower than the first pressure, at least one valve adapted to regulate a communication between the tank and the inner volume of the tire, the valve comprising at least one elastic element operatively associated with a closure member designed to open and close a port of the valve to bring the tank into communication with the tire.

WO2007/105427 discloses tires have a plurality of air chambers along the tread width direction, an air tire inner pressure control device includes a sensor unit for instructing a controller that a four-wheel automobile is going to turn to the leftward or rightward direction, and the controller for differentiating the inner pressure of the plurality of air chambers according to the instruction from the sensor unit.

CITATION LIST

Patent Literature

[PTL 1]
  WO2005/084967
[PTL 2]
  WO2007/105427

However with the solutions disclosed in these documents, the rolling assembly, the wheel and/or the tire, has to adapt to the solution, which makes difficult to use conventional rolling assembly with minor adaptation or without any adaptation to the rolling assembly. Moreover the solutions disclosed in these documents not at all mention regarding humidity contained in the gas filled in the internal cavity. Thus there is a desire to have a device enables to solve the problem related to humidity contained in the gas filled in the internal cavity with minor adaptation or without any adaptation to conventional rolling assembly.

Therefore, there is a need for a device which provides improvement on excessive increase of internal pressure during usage, with minor adaptation or without any adaptation to conventional rolling assembly.

Definitions

A "thermoelectric cooler" is a solid-state active heat pump instrument which transfers heat from one side to the other with consumption of electrical energy. The "thermoelectric cooler" may also be called as a Peltier device, a Peltier heat pump, a Peltier cooler/heater, solid state refrigerator or a thermoelectric heat pump.

It is thus an object of the invention to provide a device which provides improvement on excessive increase of internal pressure during usage, with minor adaptation or without any adaptation to conventional rolling assembly.

SUMMARY OF INVENTION

The present invention provides a device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, the device comprising a cold spot placed in the inner cavity of the rolling assembly for condensing vapor contained in a gas filled in the inner cavity, the device comprises a storage mean for capturing and keeping condensed vapor.

This arrangement provides an improvement on excessive increase of internal pressure during usage, with minor adaptation or without any adaptation to conventional rolling assembly.

Since the device comprises the cold spot placed in the inner cavity of the rolling assembly, the cold spot is able to prevent water being present in a form of vapor in the inner cavity of the rolling assembly by condensing vapor contained in the gas filled in the inner cavity into a form of liquid. Therefore it is possible to prevent excessive increase of internal pressure.

Since the device comprising the cold spot placed in the inner cavity of the rolling assembly is simple and small enough, installation of the device requires no or a little adaptation to the rolling assembly. Therefore, it is possible to install the device with minor adaptation or without any adaptation to conventional rolling assembly.

Since the device comprises the storage mean for capturing and keeping condensed vapor, condensed vapor is collected to the storage mean via centrifugation or other mechanisms preventing condensed vapor returning to the inner cavity and being converted into vapor again. Therefore it is further possible to prevent excessive increase of internal pressure.

In another preferred embodiment, the storage mean has at least one storage layer filled in the storage mean at least partly.

According to this arrangement, the at least one storage layer holds effectively condensed vapor in the storage mean, thus it is further possible to prevent excessive increase of internal pressure.

In another preferred embodiment, the at least one storage layer is made of a material selected from the group consisting of microporous material, water reactive material, water absorbent polymer or mixture of these materials.

According to this arrangement, as these materials effectively and efficiently keeps condensed vapor by its nature or its construction, thus it is still further possible to prevent excessive increase of internal pressure.

In another preferred embodiment, the device is partly exposed to the air outside of the rolling assembly through the wheel and/or the tire.

According to this arrangement, it is possible to effectively and efficiently condense vapor contained in the gas filled in the inner cavity of the rolling assembly for a long duration, as the part exposed to the air outside of the rolling assembly can release heat energy absorbed during condensation of vapor contained in the gas filled in the inner cavity of the rolling assembly.

In another preferred embodiment, the device further comprises a heat exchanging mean attached to the cold spot.

According to this arrangement, it is possible to effectively and efficiently condense vapor contained in the gas filled in the inner cavity of the rolling assembly for a long duration, as the heat exchanging mean attached to the cold spot can release heat energy absorbed during condensation of vapor contained in the gas filled in the inner cavity of the rolling assembly.

In another preferred embodiment, the cold spot is a thermoelectric cooler provided with a power supply to the cold spot.

According to this arrangement, it is further possible to effectively and efficiently condense vapor contained in the gas filled in the inner cavity of the rolling assembly for a long duration, as the thermoelectric cooler creates heat flux from one side of the thermoelectric cooler to the other via the Peltier effect when an electric power flows through the thermoelectric cooler.

In another preferred embodiment, the heat exchanging mean has a plurality of fins.

According to this arrangement, it is further possible to effectively and efficiently condense vapor contained in the gas filled in the inner cavity of the rolling assembly, as the plurality of fins increase surface areas of the heat exchanging mean for transferring heat energy absorbed via the cold spot during condensation of vapor contained in the gas filled in the inner cavity of the rolling assembly.

In another preferred embodiment, the device is affixed onto the tire internal surface.

According to this arrangement, it is possible to install the device into the rolling assembly easily with no adaptation required to the wheel.

In another preferred embodiment, the device is affixed onto the wheel internal surface.

According to this arrangement, it is possible to install the device into the rolling assembly easily and securely as the wheel internal surface is a hard-solid surface closer to a center of rotation with no adaptation required to the tire, installing the device onto the hard-solid surface closer to the center of rotation also makes easier for balancing the rolling assembly.

In another preferred embodiment, the wheel comprises a heat conductive portion surrounded by a heat insulating portion, and the device is affixed onto the wheel internal surface corresponding to the heat conductive portion.

According to this arrangement, it is further possible to effectively and efficiently condense vapor contained in the gas filled in the inner cavity of the rolling assembly, as the heat conductive portion surrounded by the heat insulating portion is not affected by heat generated during usage, for example from a brake system, from an exhaust system or even from hot parts of the rolling assembly, thanks to the heat insulating portion surrounding the heat conductive portion preventing degradation of performance of the device.

In another preferred embodiment, the rolling assembly further comprises a tank filled via a compressed gas affixed onto the wheel, and the tank comprises a mean to blow the compressed gas to a portion of the wheel corresponding to the position on the wheel internal surface where the device being affixed onto.

According to this arrangement, it is further possible to effectively and efficiently condense vapor contained in the gas filled in the inner cavity of the rolling assembly, as the compressed gas blown to the wheel corresponding to the position on the wheel internal surface where the device being affixed onto expands while taking heat away of surroundings including the wheel.

Advantageous Effects of Invention

According to the arrangements described above, it is possible to provide an improvement on excessive increase of internal pressure during usage, with minor adaptation or without any adaptation to conventional rolling assembly.

BRIEF DESCRIPTION OF DRAWINGS

Other characteristics and advantages of the invention arise from the description made hereafter in reference to the annexed drawings which show, as nonrestrictive examples, the embodiment of the invention.

In these drawings.

DESCRIPTION OF EMBODIMENTS

Preferred embodiments of the present invention will be described below referring to the drawings.

Figure 1:
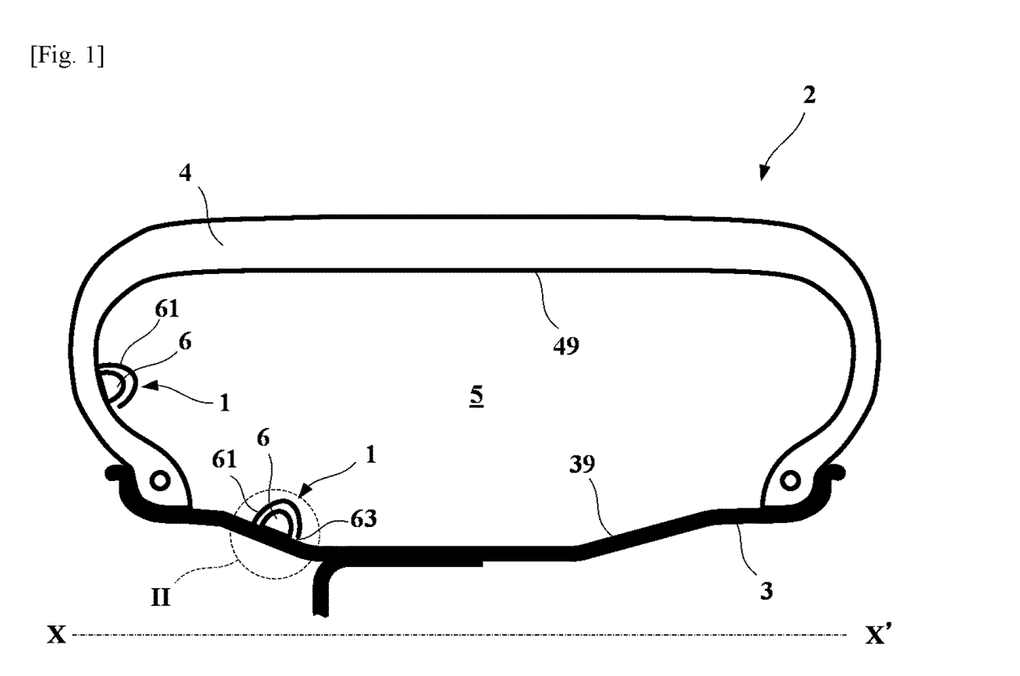
FIG. 1 is a schematic sectional view of a rolling assembly provided with a device according to a first embodiment of the present invention.
Figure 2:
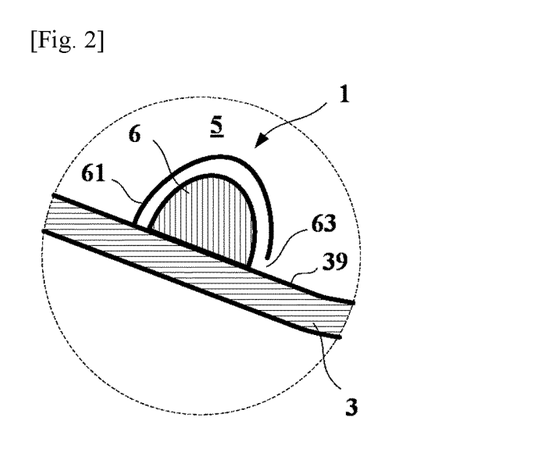
FIG. 2 is an enlarged schematic view showing a portion indicated as II in FIG. 1.
Figure 3:
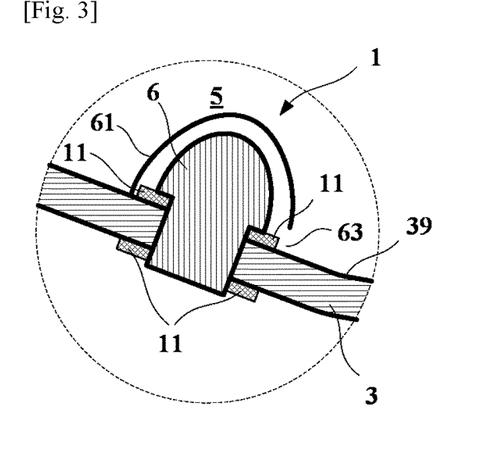
FIG. 3 is an enlarged schematic view showing a portion corresponding to the portion indicated as II in FIG. 1 according to a variant of the first embodiment.

A device 1 according to a first embodiment of the present invention will be described referring to FIGS. 1, 2 and 3. FIG. 1 is a schematic sectional view of a rolling assembly provided with a device according to a first embodiment of the present invention. FIG. 2 is an enlarged schematic view showing a portion indicated as II in FIG. 1. FIG. 3 is an enlarged schematic view showing a portion corresponding to the portion indicated as II in FIG. 1 according to a variant of the first embodiment.

The device 1 is a device for preventing excessive increase of an internal pressure of a rolling assembly 2. The rolling assembly 2 having a rotation axis X-X' and comprising a wheel 3 and a tire 4, the tire 4 being mounted onto the wheel 3 creating an inner cavity 5 surrounded by a wheel internal surface 39 and a tire internal surface 49. The device 1 comprises a cold spot 6 placed in the inner cavity 5 of the rolling assembly 2 for condensing vapor contained in a gas filled in the inner cavity 5.

As shown in FIG. 1, the rolling assembly 2 is provided with two devices 1, one is affixed onto the tire internal surface 49 and another is affixed onto the wheel internal surface 39.

As shown in FIG. 1 and FIG. 2, the two devices 1 each consist of the cold spot 6 and comprises a storage mean 61 as to cover the cold spot 6, and the two devices 1 themselves both have no direct communication with the air outside of the rolling assembly 2, but are affixed onto a sidewall portion of the tire 4 considered as a coldest point in the tire 4 and a rim portion of the wheel 3 considered as a coldest point in the wheel 3, and possible to exchange a heat between the inner cavity 5 and air outside of the rolling assembly 2 through the tire 4 and/or the wheel 3.

The cold spot 6 is a portion of the device 1 enables to exchange heat between the air outside of the rolling assembly 2 and the inner cavity 5 of the rolling assembly 2 through a channel 63. This heat exchange makes it possible to condense water contained in the gas filled in the inner cavity 5 in a form of vapor which increases the internal pressure of the inner cavity 5 in addition to expected internal pressure with temperature to a form of liquid which decreases drastically such the addition to expected internal pressure of the rolling assembly 2. The condensed vapor is collected to the storage mean 61 via centrifugation or other mechanisms preventing condensed vapor returning to the inner cavity 5 and being converted into vapor again.

As shown in FIG. 3 as a variant, the device 1 is partly exposed to the air outside of the rolling assembly 2 through the wheel 3 and/or the tire 4. In this present embodiment, the device 1 affixed onto the wheel 3 is partly exposed to the air outside of the rolling assembly 2 provided with two seals 11 for preventing leakage of the gas filled in the inner cavity 5.

Since the device 1 comprises the cold spot 6 placed in the inner cavity 5 of the rolling assembly 2, the cold spot 6 is able to prevent water being present in a form of vapor in the inner cavity 5 of the rolling assembly 2 by condensing vapor contained in the gas filled in the inner cavity 5 into a form of liquid. Therefore it is possible to prevent excessive increase of internal pressure.

Since the device 1 comprising the cold spot 6 placed in the inner cavity 5 of the rolling assembly 2 is simple and small enough, installation of the device 1 requires no or a little adaptation to the rolling assembly 2. Therefore, it is possible to install the device 1 with minor adaptation or without any adaptation to conventional rolling assembly 2.

Since the device 1 is affixed onto the tire internal surface 49, it is possible to install the device 1 into the rolling assembly 2 easily with no adaptation required to the wheel 3.

Since the device 1 is affixed onto the wheel internal surface 39, it is possible to install the device 1 into the rolling assembly 2 easily and securely as the wheel internal surface 39 is a hard-solid surface closer to a center of rotation with no adaptation required to the tire 4, installing the device 1 onto the hard-solid surface closer to the center of rotation also makes easier for balancing the rolling assembly 2.

Since the device 1 is partly exposed to the air outside of the rolling assembly 2 through the wheel 3 and/or the tire 4, it is possible to effectively and efficiently condense vapor contained in the gas filled in the inner cavity 5 of the rolling assembly 2 for a long duration, as the part exposed to the air outside of the rolling assembly 2 can release heat energy absorbed during condensation of vapor contained in the gas filled in the inner cavity 5 of the rolling assembly 2.

Since the device 1 comprises the storage mean 61 for capturing and keeping condensed vapor, it is further possible to prevent excessive increase of internal pressure as condensed vapor is collected to the storage mean 61 via centrifugation or other mechanisms preventing condensed vapor returning to the inner cavity 5 and being converted into vapor again.

The rolling assembly 2 may be provided with one single device 1 affixed onto the wheel 3 or the tire 4. The rolling assembly 2 may be provided with a plurality of devices 1.

The device 1 may be affixed onto the wheel internal surface 39 or the tire internal surface 49 via any means known for those skilled in the art; for example via an adhesive, glue, beeswax, screw, double-sided tape, hook-and-loop fastener, etc. A portion of the wheel 3 or the tire 4 where the device 1 being affixed onto may have a thickness thinner than other portion of the wheel 3 or the tire 4 for efficient heat exchange between the air outside of the rolling assembly 2 and the inner cavity 5 of the rolling assembly 2.

The cold spot 6 may be made of any material having high heat conductivity higher than a material constituting the wheel 3; for example gold, copper, silver, aluminum, (artificial) diamond or alloy of these materials, carbon nano tube, ceramics like beryllia, silicon carbide, aluminum nitride, etc.

The device 1 may be applicable to any type of rolling assembly provided with a pneumatic tire, for example for passenger car, truck, two wheels, etc.

Figure 4:
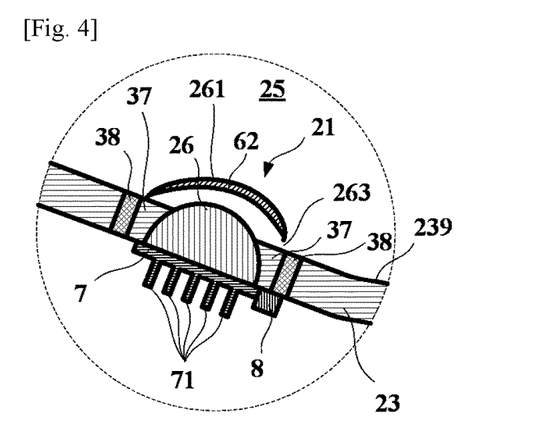
FIG. 4 is an enlarged schematic view showing a portion corresponding to the portion indicated as II in FIG. 1 according to a second embodiment of the present invention.

A device 21 according to a second embodiment of the present invention will be described referring to FIG. 4. FIG. 4 is an enlarged schematic view showing a portion corresponding to the portion indicated as II in FIG. 1 according to a second embodiment of the present invention. The construction of this second embodiment is similar to that of the first embodiment other than the arrangement shown in FIG. 4, thus description will be made referring to FIG. 4.

As shown in FIG. 4, the device 21 comprises a cold spot 26 provided with a storage mean 261 as to cover the cold spot 26 and placed in an inner cavity 25 of a rolling assembly (not shown) comprising a wheel 23 and a tire (not shown) mounted onto the wheel 23, creating the inner cavity 25 surrounded by a tire internal surface (not shown) and a wheel internal surface 239. The storage mean 261 is provided as to have at least one storage layer 62 filled in the storage mean 261 at least partly. The cold spot 26 and the inner cavity 25 is connected through a channel 263. In this embodiment, the at least one storage layer 62 is composed of one layer of hydrophilic foam microporous material.

As shown in FIG. 4, the device 21 further comprises a heat exchanging mean 7 attached to the cold spot 26, and the heat exchanging mean 7 has a plurality of fins 71. In this embodiment, the cold spot 26 is a thermoelectric cooler provided with a power supply 8 to the cold spot 26. The power supply 8 to the cold spot 26 may be a battery of any type, for example coin cell, lithium (polymer) cell that is small enough.

As shown in FIG. 4, the wheel 23 comprises a heat conductive portion 37 surrounded by a heat insulating portion 38, and the device 21 is affixed onto the wheel internal surface 239 corresponding to the heat conductive portion 37 as to embedded in the heat conductive portion 37. The heat exchanging mean 7, the plurality of fins 71 and the power supply 8 as portions of the device 21 are exposed to the air outside of the rolling assembly through the heat conductive portion 37 of the wheel 23.

Since the device 21 further comprises the heat exchanging mean 7 attached to the cold spot 26, it is possible to effectively and efficiently condense vapor contained in the gas filled in the inner cavity 25 of the rolling assembly for a long duration, as the heat exchanging mean 7 attached to the cold spot 26 can release heat energy absorbed during condensation of vapor contained in the gas filled in the inner cavity 25 of the rolling assembly.

Since the heat exchanging mean 7 has the plurality of fins 71, it is further possible to effectively and efficiently condense vapor contained in the gas filled in the inner cavity 25 of the rolling assembly, as the plurality of fins 71 increase surface areas of the heat exchanging mean 7 for transferring heat energy absorbed via the cold spot 26 during condensation of vapor contained in the gas filled in the inner cavity 25 of the rolling assembly.

Since the cold spot 26 is a thermoelectric cooler provided with a power supply 8 to the cold spot 26, it is further possible to effectively and efficiently condense vapor contained in the gas filled in the inner cavity 25 of the rolling assembly for a long duration, as the thermoelectric cooler creates heat flux from one side of the thermoelectric cooler to the other via the Peltier effect when an electric power flows through the thermoelectric cooler.

Since the wheel 23 comprises the heat conductive portion 37 surrounded by the heat insulating portion 38, and the device 21 is affixed onto the wheel internal surface 239 corresponding to the heat conductive portion 37, it is further possible to effectively and efficiently condense vapor contained in the gas filled in the inner cavity 25 of the rolling assembly, as the heat conductive portion 37 surrounded by the heat insulating portion 38 is not affected by heat generated during usage, for example from a brake system, from an exhaust system or even from hot parts of the rolling assembly, thanks to the heat insulating portion 38 surrounding the heat conductive portion 37 preventing degradation of performance of the device 21.

Since the device 21 comprises the storage mean 261 for capturing and keeping condensed vapor, it is further possible to prevent excessive increase of internal pressure as condensed vapor is collected to the storage mean 261 via centrifugation or other mechanisms preventing condensed vapor returning to the inner cavity 25 and being converted into vapor again.

Since the storage mean 261 has at least one storage layer 62 filled in the storage mean 261 at least partly, it is further possible to prevent excessive increase of internal pressure as the at least one storage layer 62 holds effectively condensed vapor in the storage mean 261.

A material constituting the heat conductive portion 37 may be the same material as a material constituting the wheel 23, or may be a different material having higher heat conductivity than the material constituting the wheel 23 as exampled previously. A material constituting the heat insulating portion 38 may be a material having lower heat conductivity than the material constituting the wheel 23, for example titanium, iron, steel, lead, bismuth or alloy of these materials.

A material constituting the at least one storage layer 62 is preferably a material selected from the group consisting of microporous material, water reactive material, water absorbent polymer or mixture of these materials, as these materials effectively and efficiently keeps condensed vapor by its nature or its construction, thus it is still further possible to prevent excessive increase of internal pressure.

Examples of microporous material may be hydrophilic foams or hydrophilic polyurethane, crosslinked or not. Examples of water reactive material may be any desiccant or dehydrating agent such as phosphorus pentoxide. Example of water absorbent polymer may be any type of superabsorbent polymer as sodium polyacrylate or potassium polyacrylate.

Figure 5:
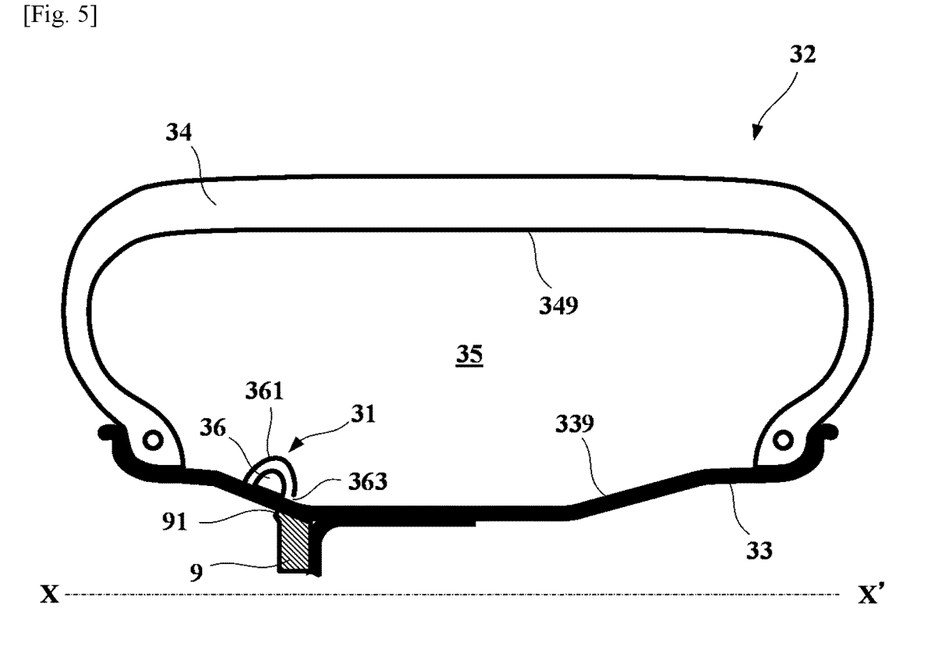
FIG. 5 is a schematic sectional view of a rolling assembly provided with a device according to a third embodiment of the present invention.

A device 31 according to a third embodiment of the present invention will be described referring to FIG. 5. FIG. 5 is a schematic sectional view of a rolling assembly provided with a device according to a third embodiment of the present invention. The construction of this third embodiment is similar to that of the first and the second embodiments other than the arrangement shown in FIG. 5, thus description will be made referring to FIG. 5.

As shown in FIG. 5, the device 31 comprises a cold spot 36 provided with a storage mean 361 as to cover the cold spot 36 and placed in an inner cavity 35 of a rolling assembly 32 comprising a wheel 33 and a tire 34 mounted onto the wheel 33, creating the inner cavity 35 surrounded by a tire internal surface 349 and a wheel internal surface 339. The device 31 is affixed onto the wheel internal surface 339 of the rolling assembly 32. The cold spot 36 and the inner cavity 35 is connected through a channel 363.

As shown in FIG. 5, the rolling assembly 32 further comprises a tank 9 filled via a compressed gas affixed onto the wheel 33, and the tank 9 comprises a mean to blow the compressed gas (not shown) through a tank outlet 91 to a portion of the wheel 33 corresponding to the position on the wheel internal surface 339 where the device 31 being affixed onto.

Since the device 31 comprises the storage mean 361 for capturing and keeping condensed vapor, it is further possible to prevent excessive increase of internal pressure as condensed vapor is collected to the storage mean 361 via centrifugation or other mechanisms preventing condensed vapor returning to the inner cavity 35 and being converted into vapor again.

Since the rolling assembly 32 further comprises a tank 9 filled via a compressed gas affixed onto the wheel 33, and the tank 9 comprises a mean to blow the compressed gas (not shown) to a portion of the wheel 33 corresponding to the position on the wheel internal surface 339 where the device 31 being affixed onto, it is further possible to effectively and efficiently condense vapor contained in the gas filled in the inner cavity of the rolling assembly 32, as the compressed gas blown to the wheel 33 corresponding to the position on the wheel internal surface 339 where the device 31 being affixed onto expands while taking heat away of surroundings including the wheel.

The mean to blow the compressed gas from the tank 9 through the tank outlet 91 may be a valve opens remotely or using centrifugal force. The tank 9 may be covered by a mean to isolate the tank 9 from heat. The tank 9 may be integrated into the wheel 33.

The wheel 33 may be provided with a heat conductive portion and a heat insulating portion, and the device 31 may be affixed onto the wheel internal surface 339 corresponding to the heat conductive portion, as explained previously, and the compressed gas may be blown to the heat conductive portion.

Figure 6:
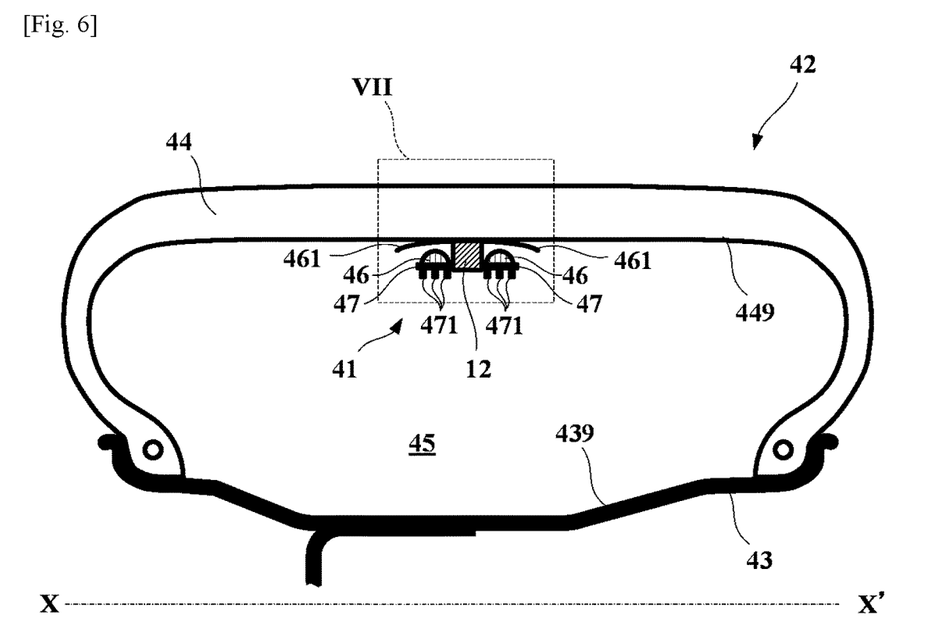
FIG. 6 is a schematic sectional view of a rolling assembly provided with a device according to a fourth embodiment of the present invention.
Figure 7:
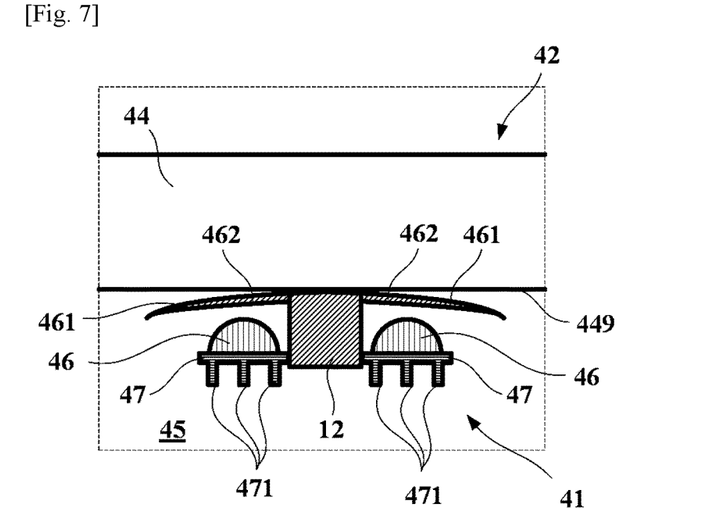
FIG. 7 is an enlarged schematic view showing a portion indicated as VII in FIG. 6.

A device 41 according to a fourth embodiment of the present invention will be described referring to FIGS. 6 and 7. FIG. 6 is a schematic sectional view of a rolling assembly provided with a device according to a fourth embodiment of the present invention. FIG. 7 is an enlarged schematic view showing a portion indicated as VII in FIG. 6. The construction of this fourth embodiment is similar to that of the first, the second and the third embodiments other than the arrangement shown in FIGS. 6 and 7, thus description will be made referring to FIGS. 6 and 7.

As shown in FIG. 6, the device 41 comprises a plurality of cold spots 46 each of them provided with a storage mean 461 as to cover each of the cold spots 46 placed in an inner cavity 45 of a rolling assembly 42 comprising a wheel 43 and a tire 44 mounted onto the wheel 43, creating the inner cavity 45 surrounded by a tire internal surface 449 and a wheel internal surface 439. The device 41 is affixed onto the tire internal surface 449 of the rolling assembly 42 via a fixing mean 12.

As shown in FIGS. 6 and 7, the device 41 further comprises a heat exchanging mean 47 attached to each the cold spot 46, and each the heat exchanging mean 47 has a plurality of fins 471.

As shown in FIG. 7, both the storage means 461 are provided as to have at least one storage layer 462 filled in the storage mean 461 at least partly. In this embodiment, the at least one storage layer 462 is composed of one layer of phosphorus pentoxide as water reactive material.

Since the device 41 further comprises a heat exchanging mean 47 attached to the cold spot 46, it is possible to effectively and efficiently condense vapor contained in the gas filled in the inner cavity 45 of the rolling assembly 42 for a long duration, as the heat exchanging mean 47 attached to the cold spot 46 can release heat energy absorbed during condensation of vapor contained in the gas filled in the inner cavity 45 of the rolling assembly 42.

Since the heat exchanging mean 47 has a plurality of fins 471, it is further possible to effectively and efficiently condense vapor contained in the gas filled in the inner cavity of the rolling assembly 42, as the plurality of fins 471 increase surface areas of the heat exchanging mean 47 for transferring heat energy absorbed via the cold spot 46 during condensation of vapor contained in the gas filled in the inner cavity 45 of the rolling assembly 42.

Since the device 41 is affixed onto the tire internal surface 449, it is possible to install the device 41 into the rolling assembly 42 easily with no adaptation required to the wheel 43.

Since the device 41 comprises the storage mean 461 for capturing and keeping condensed vapor, it is further possible to prevent excessive increase of internal pressure as condensed vapor is collected to the storage mean 461 via centrifugation or other mechanisms preventing condensed vapor returning to the inner cavity 45 and being converted into vapor again.

Since the storage mean 461 has at least one storage layer 462 filled in the storage mean 461 at least partly, it is further possible to prevent excessive increase of internal pressure as the at least one storage layer 462 holds effectively condensed vapor in the storage mean 461.

The device 41 may be provided with one single storage mean 461 as to cover all the plurality of cold spots 46, with or without the storage layer 462. The storage layer 462 may be provided only at a place corresponding to the plurality of cold spots 46, or as to cover whole the storage mean 461.

The fixing mean 12 may be any mean enable to install a sensor inside the rolling assembly known for those skilled in the art, for example as disclosed in WO2005/035277. The fixing mean 12 may be attached to the tire internal surface 449 via the mean explained previously.

The invention is not limited to the examples described and represented and various modifications can be made there without leaving its framework.

REFERENCE SIGNS LIST 1, 21, 31, 41 device
11 seal
12 fixing mean
2, 32, 42 rolling assembly
3, 23, 33, 43 wheel
39, 239, 339, 439 wheel internal surface
37 heat conductive portion
38 heat insulating portion
4, 34, 44 tire
49, 349, 449 tire internal surface
5, 25, 35, 45 inner cavity
6, 26, 36, 46 cold spot
61, 261, 361, 461 storage mean
62, 462 storage layer
63, 263, 363 channel
7, 47 heat exchanging mean
71, 471 fin
8 power supply
9 tank
91 tank outlet

The invention claimed is:

1. A device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, comprising:
   a cold spot placed in the inner cavity of the rolling assembly for condensing vapor contained in a gas filled in the inner cavity;
   a storage mean for capturing and keeping condensed vapor; and
   a heat exchanging mean attached to the cold spot.

2. The device according to claim 1, wherein the storage mean has at least one storage layer filled in the storage mean at least partly.

3. The device according to claim 2, wherein the at least one storage layer is made of a material selected from the group consisting of microporous material, water reactive material, water absorbent polymer or mixtures thereof.

4. The device according to claim 1, wherein the device is partly exposed to the air outside of the rolling assembly through the wheel and/or the tire.

5. The device according to claim 1, wherein the cold spot is a thermoelectric cooler provided with a power supply to the cold spot.

6. The device according to claim 1, wherein the heat exchanging mean has a plurality of fins.

7. The device according to claim 1, wherein the device is affixed onto the tire internal surface.

8. The device according to claim 1, wherein the device is affixed onto the wheel internal surface.

9. The device according to claim 8, wherein the wheel comprises a heat conductive portion surrounded by a heat insulating portion, and
wherein the device is affixed onto the wheel internal surface corresponding to the heat conductive portion.

10. The device according to claim 8, wherein the rolling assembly further comprises a tank filled via a compressed gas affixed onto the wheel, and
wherein the tank comprises a mean to blow the compressed gas to a portion of the wheel corresponding to a position on the wheel internal surface where the device is affixed.

11. A device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, comprising:
a cold spot placed in the inner cavity of the rolling assembly for condensing vapor contained in a gas filled in the inner cavity; and
a storage mean for capturing and keeping condensed vapor,
wherein the wheel comprises a heat conductive portion surrounded by a heat insulating portion, and
wherein the device is affixed onto the wheel internal surface corresponding to the heat conductive portion.

12. The device according to claim 11, wherein the storage mean has at least one storage layer filled in the storage mean at least partly.

13. The device according to claim 12, wherein the at least one storage layer is made of a material selected from the group consisting of microporous material, water reactive material, water absorbent polymer or mixtures thereof.

14. The device according to claim 11, wherein the device is partly exposed to the air outside of the rolling assembly through the wheel and/or the tire.

15. The device according to claim 11, wherein the device further comprises a heat exchanging mean attached to the cold spot.

16. The device according to claim 15, wherein the cold spot is a thermoelectric cooler provided with a power supply to the cold spot.

17. The device according to claim 15, wherein the heat exchanging mean has a plurality of fins.

18. The device according to claim 11, wherein the device is affixed onto the tire internal surface.

19. The device according to claim 11, wherein the rolling assembly further comprises a tank filled via a compressed gas affixed onto the wheel, and
wherein the tank comprises a mean to blow the compressed gas to a portion of the wheel corresponding to a position on the wheel internal surface where the device is affixed.

20. A device for preventing excessive increase of an internal pressure of a rolling assembly, the rolling assembly having a rotation axis and comprising a wheel and a tire, the tire being mounted onto the wheel creating an inner cavity surrounded by a wheel internal surface and a tire internal surface, comprising:
a cold spot placed in the inner cavity of the rolling assembly for condensing vapor contained in a gas filled in the inner cavity; and
a storage mean for capturing and keeping condensed vapor,
wherein the device is affixed onto the wheel internal surface,
wherein the rolling assembly further comprises a tank filled via a compressed gas affixed onto the wheel, and
wherein the tank comprises a mean to blow the compressed gas to a portion of the wheel corresponding to a position on the wheel internal surface where the device is affixed.

21. The device according to claim 20, wherein the storage mean has at least one storage layer filled in the storage mean at least partly.

22. The device according to claim 21, wherein the at least one storage layer is made of a material selected from the group consisting of microporous material, water reactive material, water absorbent polymer or mixtures thereof.

23. The device according to claim 20, wherein the device is partly exposed to the air outside of the rolling assembly through the wheel and/or the tire.

24. The device according to claim 20, wherein the device further comprises a heat exchanging mean attached to the cold spot.

25. The device according to claim 24, wherein the cold spot is a thermoelectric cooler provided with a power supply to the cold spot.

26. The device according to claim 24, wherein the heat exchanging mean has a plurality of fins.

27. The device according to claim 20, wherein the device is affixed onto the tire internal surface.

28. The device according to claim 20, wherein the wheel comprises a heat conductive portion surrounded by a heat insulating portion, and
wherein the device is affixed onto the wheel internal surface corresponding to the heat conductive portion.

* * * * *